United States Patent
Craig et al.

(10) Patent No.: US 9,895,750 B2
(45) Date of Patent: Feb. 20, 2018

(54) FASTENER AND METHOD FOR FASTENING TO ASSOCIATED STRUCTURAL ASSEMBLY

(71) Applicant: The Boeing Company, Chicago, IL (US)

(72) Inventors: Brent F. Craig, Seattle, WA (US); Patrick K. Dillon, Sedro Woolley, WA (US); Matthew K. Roberts, San Marcos, CA (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 15/214,139

(22) Filed: Jul. 19, 2016

(65) Prior Publication Data

US 2018/0021860 A1    Jan. 25, 2018

(51) Int. Cl.
| | | |
|---|---|---|
| *B23B 49/00* | (2006.01) | |
| *B23B 49/02* | (2006.01) | |
| *B23B 47/28* | (2006.01) | |

(52) U.S. Cl.
CPC .......... *B23B 49/026* (2013.01); *B23B 47/287* (2013.01); *B23B 2215/04* (2013.01); *B23B 2247/04* (2013.01); *B23B 2247/08* (2013.01); *B23B 2247/12* (2013.01); *B23B 2260/136* (2013.01);
(Continued)

(58) Field of Classification Search
CPC ............. Y10T 408/557; Y10T 408/558; Y10T 408/563; B23B 49/026; B23B 49/02; B23B 2270/12; B23B 2247/04; B23B 2247/08; B23B 2247/12; B23B 2215/04; B23B 47/287
See application file for complete search history.

(56) References Cited

U.S. PATENT DOCUMENTS 2,294,303 A * 8/1942 Jagow ..................... B23B 49/02
                                                                 408/112
2,397,892 A * 4/1946 Sittert .................. B25B 31/005
                                                                 269/48.4
(Continued)

OTHER PUBLICATIONS

Centrix Engineer Aerospace Solutions, "High-Strength Jig Alignment/Part Clamp," http://centrix-llc.com/drupal/products/single-sided-temporary-fasteners/high-strength-jig-alignment-part-clamp (2016).

*Primary Examiner* — Daniel Howell
*Assistant Examiner* — Yasir Diab
(74) *Attorney, Agent, or Firm* — Walters & Wasylyna LLC

(57) ABSTRACT

A fastener for fastening a drill jig to overlapping work pieces and clamping the overlapping work pieces for facilitating accurate drilling of the overlapping work pieces including a fastener body and a damper assembly operatively connected to the fastener body. The damper assembly is configured to enable application of a first load to the drill jig, and the fastener body is configured to enable application of a second load to the overlapping work pieces when the fastener fastens the drill jig to the overlapping work pieces. The first load is less than the second load. The first load is sufficient to hold the drill jig to the overlapping work pieces during drilling but without causing significant deformation of the drill jig. The second load is sufficient to reduce the formation of burrs during drilling of a hole through the overlapping working pieces.

20 Claims, 7 Drawing Sheets

(52) U.S. Cl.
CPC ....... *B23B 2270/12* (2013.01); *Y10T 408/558* (2015.01); *Y10T 408/563* (2015.01)

(56) References Cited

U.S. PATENT DOCUMENTS

| | | | | |
|---|---|---|---|---|
| 2,463,731 A | * | 3/1949 | Whalen | F16B 19/109 269/48.4 |
| 2,963,927 A | * | 12/1960 | Hanger | B25H 1/0064 408/75 |
| 3,000,086 A | * | 9/1961 | Davis | F16B 5/06 24/453 |
| 3,540,322 A | * | 11/1970 | Swanson | B23B 49/02 408/112 |
| 4,027,992 A | * | 6/1977 | Mackey, Sr. | B23B 49/026 269/87.3 |
| 4,488,713 A | * | 12/1984 | Kosmal | B25B 31/005 269/25 |
| 4,601,618 A | * | 7/1986 | McEldowney | B23B 47/28 408/1 R |
| 5,048,805 A | * | 9/1991 | Wiseman | B21J 15/42 269/48.4 |
| 5,240,361 A | * | 8/1993 | Armstrong | F16B 19/109 269/48.2 |
| 5,395,187 A | * | 3/1995 | Slesinski | B23B 49/02 408/1 R |
| 6,012,877 A | * | 1/2000 | McCowin | B23B 49/02 279/2.04 |
| 6,196,779 B1 | * | 3/2001 | Falk | B25B 31/005 408/79 |
| 6,729,809 B2 | | 5/2004 | Sarh et al. | |
| 6,971,824 B2 | * | 12/2005 | Blankenship | B23B 47/28 408/3 |
| 7,195,429 B2 | | 3/2007 | Dods et al. | |
| 7,972,095 B2 | * | 7/2011 | Piggott | B23Q 3/18 269/48.2 |
| 2004/0075206 A1 | * | 4/2004 | Starr | B21J 15/42 269/25 |
| 2008/0050193 A1 | * | 2/2008 | Gamboa | B23Q 11/0046 409/137 |

* cited by examiner

FASTENER AND METHOD FOR FASTENING TO ASSOCIATED STRUCTURAL ASSEMBLY

FIELD

This application relates to mechanical fasteners and, more particularly, to fasteners for fastening a drill jig or other clamping tool to overlapping work pieces, such as pieces of aircraft structure, to facilitate drilling of the work pieces.

BACKGROUND

Accurate hole location is critical to the attachment of the pieces or parts of an assembly during a manufacturing process. To achieve this objection, overlapping pieces are typically drilled while assembled to each other using a drill jig to ensure that the holes in each piece match to each other. However, burrs tend to develop around the drill holes that interfere with the mating of the pieces. These burrs are inaccessibly trapped in the interstices of the overlapping pieces while the pieces are assembled. Therefore, assembly of the overlapping pieces may require pre-assembly of the pieces, drilling of the holes into the parts, disassembly of the pieces, deburring of the drilled holes, the application of sealant between the pieces and reassembly of the pieces into a final configuration. Assembly, disassembly and reassembly are time consuming processes that slow production.

The formation of burrs can be reduced, or avoided, if sufficient pressure is applied to hold the pieces together during drilling. The drill jig is configured and temporarily fastened to the assembled parts by a fastener in a manner that imparts sufficient clamping force to the assembled pieces prior to drilling in order to reduce or eliminate formation of the burrs.

However, the same clamping force that reduces or eliminates burr formation is also applied to the drill jig, which may significantly deform or otherwise damage the drill jig, and also could compromise the fastening capability of the drill jig to the overlapping pieces leading to dislocation of the drill jig from the overlapping pieces. Also, when the drill jig is unfastened from the overlapping pieces and moved to another drilling area, such deformation of the drill jig may cause misalignment of the drill jig bushing and pilot hole axis for the fastener and also subsequent deviation of the drill vector for drilling the pilot hole through the overlapping pieces.

SUMMARY

Disclosed is a fastener for fastening a drill jig to overlapping work pieces and clamping the overlapping work pieces for facilitating accurate drilling of the overlapping work pieces including a fastener body and a damper assembly operatively connected to the fastener body. The damper assembly is configured to enable application of a first load to the drill jig, and the fastener body is configured to enable application of a second load to the overlapping work pieces when the fastener fastens the drill jig to the overlapping work pieces. The first load is less than the second load. The first load is sufficient to hold the drill jig to the overlapping work pieces during drilling but without causing significant deformation of the drill jig. The second load is sufficient to reduce the formation of burrs during drilling of a hole through the overlapping working pieces.

Also disclosed is a structural assembly that includes a drill jig, overlapping work pieces and a fastener. The drill jig includes a drill bushing, and the overlapping work pieces include a pilot hole. The fastener extends through the drill bushing and the pilot hole to fasten the drill jig to the overlapping work pieces and clamp the overlapping work pieces together for facilitating accurate drilling of the overlapping work pieces. The fastener includes a fastener body and a damper assembly. The damper assembly is connected to the fastener body. The damper assembly enables application of a first load to the drill jig and the fastener body enables application of a second load to the overlapping work pieces. The first load is less than the second load. The first load is sufficient to hold the drill jig to the overlapping work pieces during drilling but without causing significant deformation of the drill jig. The second load is sufficient to reduce burring during drilling of a hole through said overlapping working pieces.

Also disclosed is a method for fastening a drill jig to the overlapping work pieces and clamping the overlapping work pieces together for facilitating accurate drilling of the overlapping work pieces includes (1) positioning the drill jig onto the overlapping work pieces such that a drill bushing of the drill jig is aligned over a pilot hole in the overlapping work pieces; (2) inserting a fastener through the drill bushing and the pilot hole, wherein the fastener includes a fastener body and damper assembly, wherein the damper assembly is operatively connected to the fastener body; and (3) driving the fastener to a predetermined position such that a first load is applied via the damper assembly to the drill jig and a second load is applied via the fastener body to the overlapping work pieces, wherein the first load is less than the second load, wherein the first load is sufficient to hold the drill jig to the overlapping work pieces during drilling but without causing significant deformation of the drill jig, wherein the second load is sufficient to reduce burring during drilling of a hole through the overlapping working pieces.

Other embodiments of the disclosed fastener and associated structural assembly will become apparent from the following detailed description, the accompanying drawings and the appended claims.

DETAILED DESCRIPTION

Figure 2:
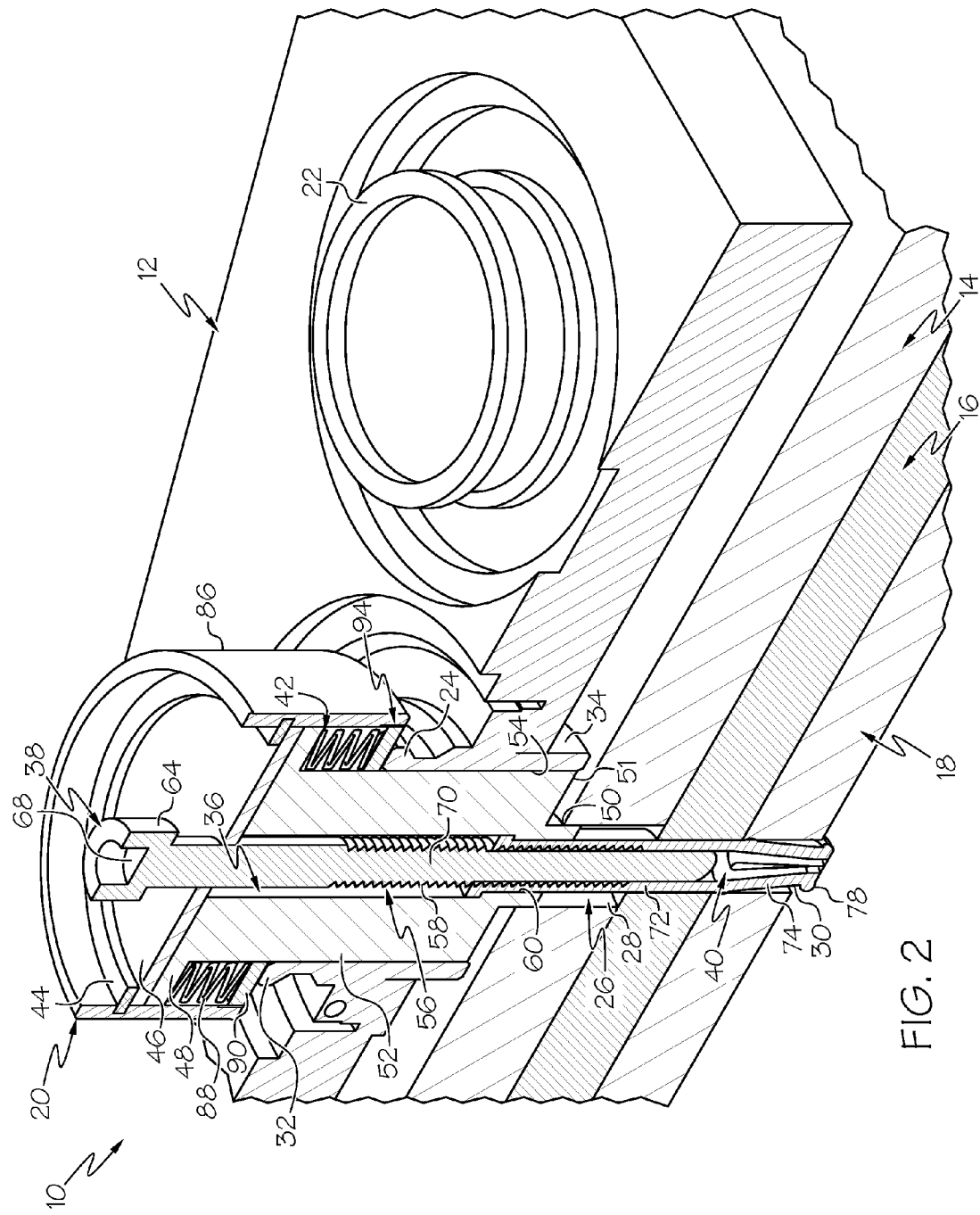
FIG. 2 is a perspective view of a cut away portion of a structural assembly including overlapping work pieces, a drill jig and the fastener of FIG. 1 connected together in a first state.

FIG. 2 illustrates a structural assembly 10 that comprises a drill jig 12, overlapping first, second and third work pieces 14, 16, 18, and a single-sided fastener 20 for fastening the drill jig 12 to the overlapping work pieces 14, 16, 18, such as pieces of aircraft structure, to facilitate drilling of the work pieces 14, 16, 18. In one application, the work pieces 14, 16, 18 may form a lamina stack assembly from an aircraft structure. The lamina stack assembly may include one or more metallic pieces (e.g., titanium or aluminum) and one or more composite pieces (e.g., carbon fiber reinforced plastic (CFRP)). In this embodiment, the first and third work pieces 14, 18 may be formed of aluminum and the second work piece 16, located between the first and third work pieces 14, 18, may be formed of CFRP. However, the material stack ups may comprise various types of structural members, which are ultimately application specific, any of which may be connected together using the disclosed fastener 20 and drill jig 12, whether for aerospace applications or non-aerospace applications, without departing from the scope of the present disclosure.

The drill jig 12 is generally a plate-like member that serves as a template for the drilling of holes through the work pieces 14, 16, and 18. The drill jig 12 includes a first drill bushing 22 that serves as a guide for the drilling of aligned holes through the work pieces 14, 16, 18. These holes receive fasteners such as rivets for permanently fastening the work pieces 14, 16, 18 together. The drill jig 12 also includes a second drill bushing 24 that may be used for the drilling of a pilot hole 26 through the work pieces. Alternatively, the pilot hole 26 may be predrilled before the drill jig 12 is position upon the work pieces 14, 16, 18. The pilot hole 26 receives the fastener 20 for temporarily fastening the drill jig 12 to the overlapping work pieces 14, 16, 18. The pilot hole 26 includes a first pilot hole portion 28 located in the first work piece 14 adjacent the drill jig 12, and a smaller sized second pilot hole portion 30 located in the second and third workpieces 16, 18. In this embodiment, the second drill bushing 24 may have a lip 32 formed on its top (as viewed in FIG. 2) and a bushing boss 34 on its lower end. In other embodiments, the second drill bushing 24 may not have a lip. The drill jig 12 may be formed from various materials, including combinations of materials, that are lightweight, so as to be easily moved and position on the work pieces without departing from the scope of the present disclosure. In one particular construction, the drill jig 12 may be formed from a hard plastic material or metallic material (e.g., a metal or metal alloy). However, the use of other materials, such as composite materials, is also contemplated. The drill jig 12 may be formed of a material that has a hardness that is less than the hardness of the material of the overlapping work pieces 14, 16, 18.

Figure 1:
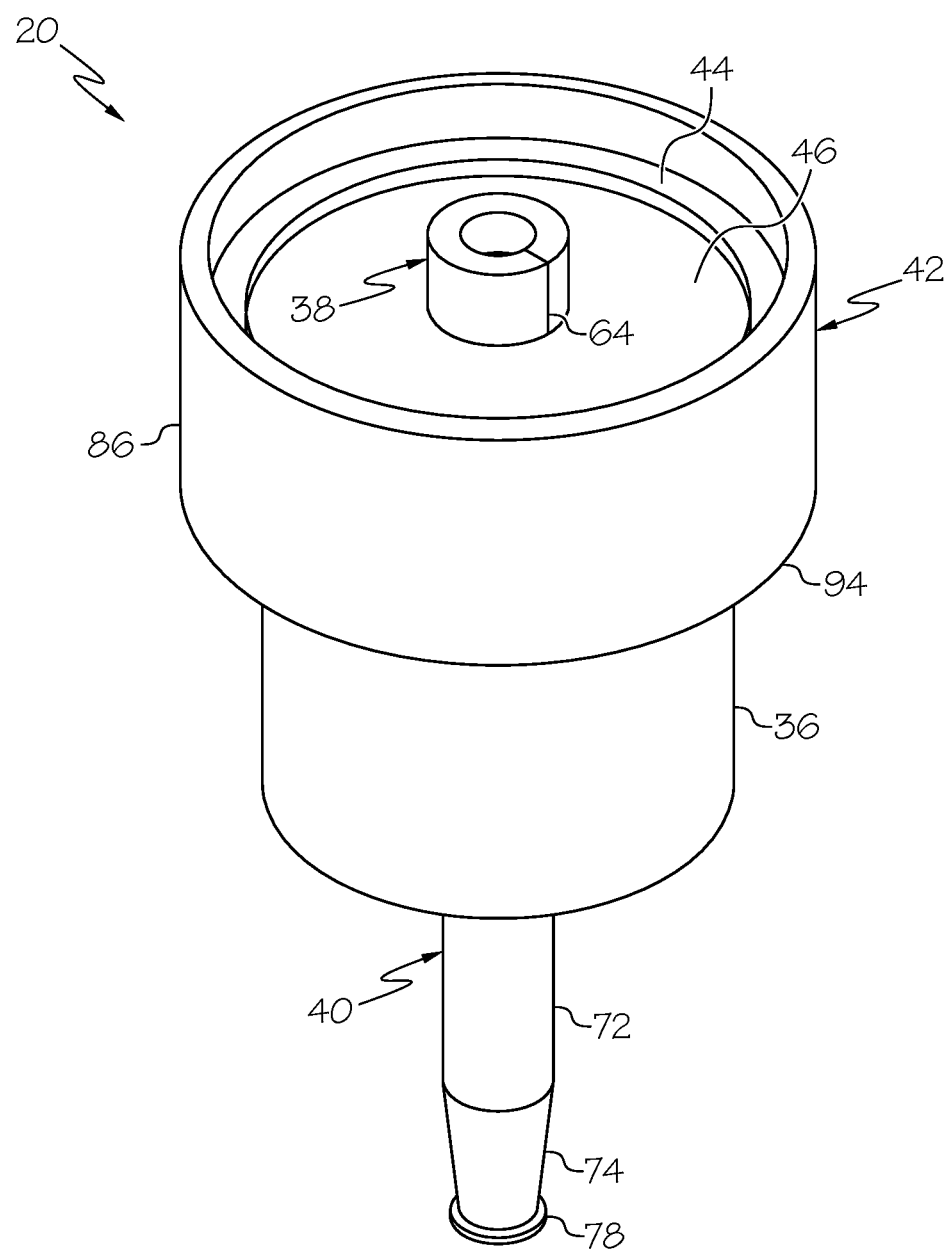
FIG. 1 is a perspective view of the fastener according to one embodiment.
Figure 3:
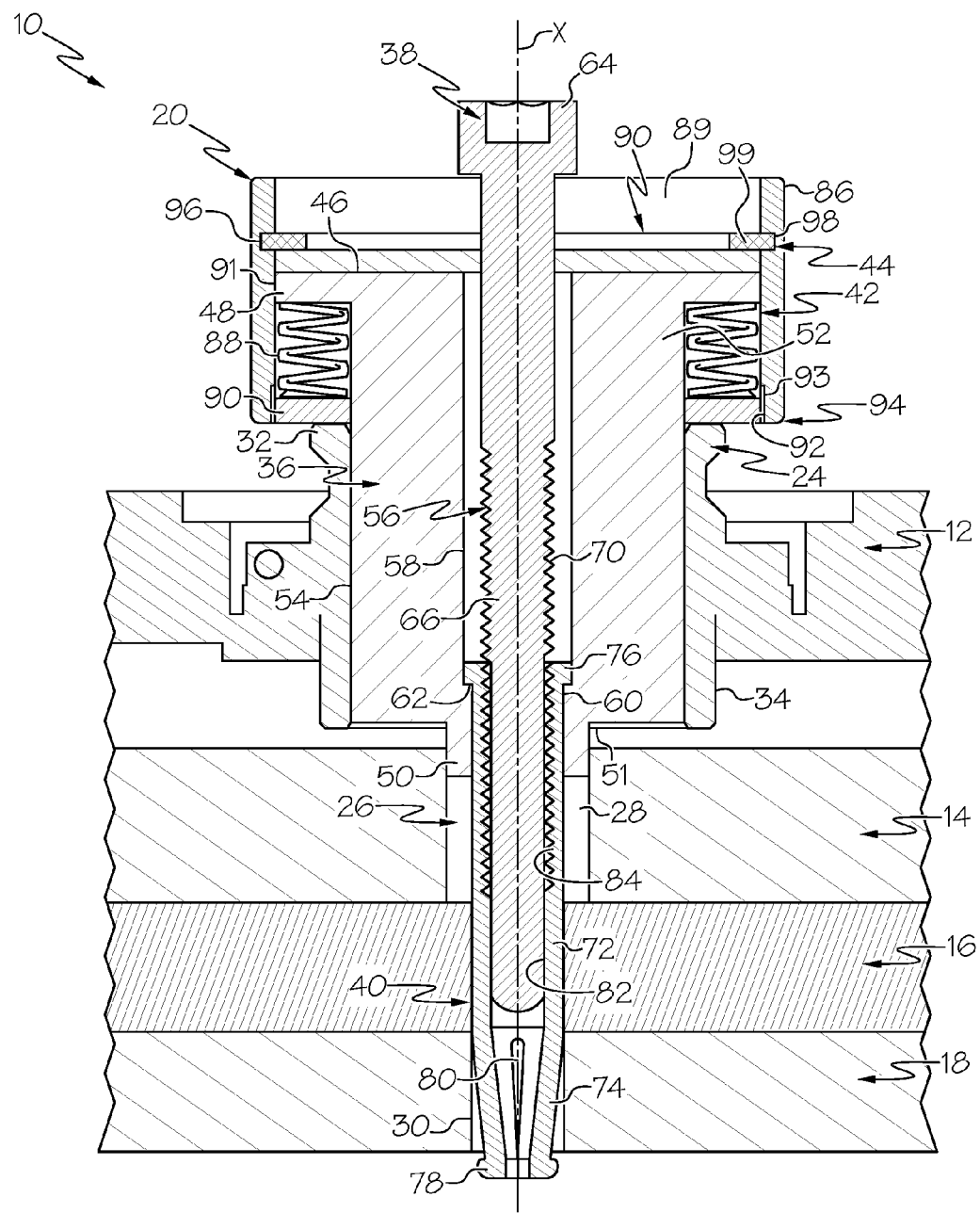
FIG. 3 is a side cross-sectional view of a portion of the overlapping work pieces, the drill jig and the fastener of FIG. 1 connected together in the first state.

Referring to FIGS. 1-3, the fastener 20 may include a fastener body 36, a bolt 38, a sleeve 40, a damper assembly 42, a retaining ring 44 and a washer 46. Additional components and features may be included in the disclosed fastener 20 without departing from the scope of the present disclosure. As seen in FIGS. 2 and 3, the fastener body 36 is cylindrical in shape and formed in one piece. The fastener body 36 includes a flange 48, a pilot boss 50 and middle portion 52 located between the flange 48 and the pilot boss 50. The flange 48 is located on an upper axial end (vis-à-vis the fastener axis X as viewed in FIG. 3) of the middle portion and the pilot boss 50 extends downwardly from an axially opposed lower axial end 51 of the middle portion 52. The flange 48, the middle portion 52 and the pilot boss 50 are coaxial with each other. The flange 48 extends a distance radially (relative to axis X) further than the middle portion 52, which extends a distance radially further than the pilot boss 50. The middle portion 52 is sized and shaped to be closely received within a through-bore 54 of the second drill bushing 24 of the drill jig 12. The pilot boss 50 is sized and shaped to be closely received in the first pilot hole portion 28 for locating the drill jig 12 relative to the pilot hole 26. The fastener body 36 may define a bolt receiving bore 56 that axially extends from the flange 48 to the pilot boss 50. The bolt receiving bore 56 includes a first cylindrical bore portion 58 located in the flange 48 and the middle portion 52, and a second cylindrical bore portion 60 located in the middle portion 52 and pilot boss 50. The first bore portion 58 merges into the second bore portion 60. The first bore portion 58 has a larger diameter than the diameter of the second bore portion 60, thereby defining a step 62 (FIG. 4) at the intersection of the first and second bore portions 58, 60.

The fastener body 36 may be formed from various materials, including combinations of materials without departing from the scope of the present disclosure. The strength and rigidity of the material forming the fastener body 36 may be a consideration since the fastener body 36 must be able to enable an application of sufficient force or load to the overlapping work pieces 14, 16, 18 to hold the overlapping work pieces 14, 16, 18 together during drilling of a hole through the overlapping work pieces 14, 16, 18. In one particular construction, the fastener body 36 may be formed from a metallic material (e.g., a metal or metal alloy). As one specific, non-limiting example, the fastener body 36 may be formed from a titanium alloy, such as an aerospace-grade titanium alloy (e.g., Ti-6Al-4V or Ti-5Al-2.5Sn). However, the use of non-metallic materials, such as polymeric and composite materials (e.g., carbon fiber reinforced plastics), is also contemplated.

The bolt 38 of the fastener 20 may include a head 64 and a shaft 66. The head 64 includes a hexagonally shaped recess 68 formed in the top of the head 64 for receiving a similar hexagonally shaped drill bit. The shaft 66 includes a threaded portion 70 located at approximately the middle of the shaft 66. The bolt 38 may be formed from various materials, including combinations of materials, without departing from the scope of the present disclosure. In one particular construction, the bolt 38 may be formed from a metallic material (e.g., a metal or metal alloy). As one specific, non-limiting example, the bolt 38 may be formed from a titanium alloy, such as an aerospace-grade titanium alloy (e.g., Ti-6Al-4V or Ti-5Al-2.5Sn). However, the use of other materials, such as composite materials, is also contemplated.

The sleeve 40 includes a hollow cylindrical portion 72 and a hollow frustoconical collet portion 74. The collet portion 74 tapers inwardly going in the axial direction from the cylindrical portion 72 towards its free end when the bolt 38 does not extend therethrough. The sleeve 40 has a first flange 76 (FIG. 3) formed at the free end of the cylindrical portion 72 and a second flange 78 formed at the free end of the collet portion 74. The collet portion 74 and second flange 78 may include axial slits 80 that extend along their axial length to allow outward and inward movement of the collet portion 74 and the second flange 78 relative to the axis X. The first flange 76 is sized to be slidingly received by the first bore portion 58 of the fastener body 36. The cylindrical portion 72 has an inner surface 82 that has a threaded portion 84 extending axially downward from the first flange 76. The cylindrical portion 72 is sized to be slidingly received by the second bore portion 60 of the fastener body 36 and snugly received by the second pilot hole portion 30 of the second work piece 16. The sleeve 40 may be formed from various materials, including combinations of materials, that allow the inward and outward flexing of the conical relative to the axis X without departing from the scope of the present disclosure. In one particular construction, the sleeve 40 may be formed from a hard plastic material or metallic material (e.g., a metal or metal alloy). However, the use of other materials, such as composite materials, is also contemplated The damper assembly 42 includes a casing 86, damper 88 and adjusting ring 90. The casing 86 is cylindrical in shape and extends around the fastener body 36. Referring to FIG. 3, the casing 86 is sized such that an inner surface 89 of the casing 86 abuts or is in close proximity to an outer side surface 91 of the flange 48. The inner surface 89 of the casing 86 includes fine threads 92 at the lower end of the casing that threadingly engage corresponding threads 93 on the adjusting ring 90. The casing 86 further includes a circumferential groove 96 formed in the inner surface 89. The adjusting ring 90 surrounds and abuts against the middle portion 52 of the fastener body 36. The casing 86, flange 48 and middle portion 52 define a damper housing 94 that houses and supports the damper 88 and also servers to prevent or reduce fluid or other contaminants entering into the damper area. The damper 88 may be any suitable device or material that will reduce the load being applied on the second drill bushing 24 of the drill jig 12 by the fastener 20. In this embodiment, the damper 88 is a Smalley wave spring. The wave spring 88 has one end that engages the underside of the flange 48 of the fastener body 36 and another end that engages the top side of the adjusting ring 90. Turning of the adjusting ring 90 about the axis X adjusts the axial length of the damper housing 94 and hence load application of the wave spring 88. This enables the desired amount of load to be applied on the drill jig 12 and, thus, compensates for the variation in amount of load application by various wave springs.

When the fastener 20 is assembled, the sleeve 40 extends through the bolt receiving bore 56 until the first flange 76 seats upon the step 62 of the fastener body 36. The bolt 38 extends through the bolt receiving bore 56 and into the cylindrical portion 72 of the sleeve 40 with the threaded portion 70 of the bolt 38 engaging the threaded portion 84 of the sleeve 40. The washer 46 bears upon the flange 48 and is held in place by the retaining ring 44. In particular, the retaining ring 44 has an outer portion 98 that seats securely into the circumferential groove 96, and an inner portion 99 that engages the side of the washer 46 opposite the side of the washer 46 bearing upon the flange 48 of the fastener body 36. The outer portion 98 of the retaining ring 44 being securely seated into the circumferential groove 96 also serves to secure the casing 86 to the other elements of the fastener 20. The washer 46 and fastener body 36 may slide or otherwise move relative to the casing.

Figure 6:
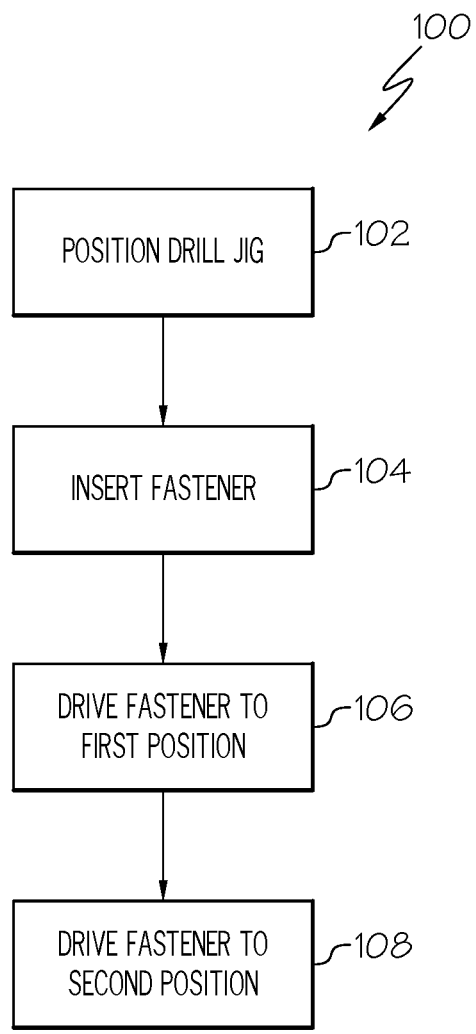
FIG. 6 is flow diagram of the method for assembling the fastener to the overlapping work pieces and the drill jig.

FIG. 6 illustrates the method 100 of fastening the fastener 20 to the drill jig 12 and overlapping work pieces 14, 16, 18. First, in step 102, the drill jig 12 is positioned over the first work piece 14 such that the second drill bushing 24 is aligned and concentric with the pilot hole 26. The fastener 20 is then, in step 104, inserted downwardly (as viewed in FIG. 3) into the second drill bushing 24 and the pilot hole 26 until the bottom of the damper assembly 42 or adjusting ring 90 rests upon the lip 32 of the second drill bushing 24, the lower axial end 51 of the middle portion 52 faces the first work piece 14 and is even with the free end of the bushing boss 34, and the sleeve 40 extends through the pilot hole 26 such that the second flange 78 is exposed out of the pilot hole 26. This position is illustrated in FIGS. 2 and 3. In this position or first state, no load is applied to the drill jig 12 and overlapping work pieces 14, 16, 18. The pilot boss 50 extends partially into the first pilot hole portion 28 of the first work piece 14 and there are gaps between the unclamped work pieces 14, 16, 18. Further, in the first state the wave spring 88 is uncompressed.

Figure 4:
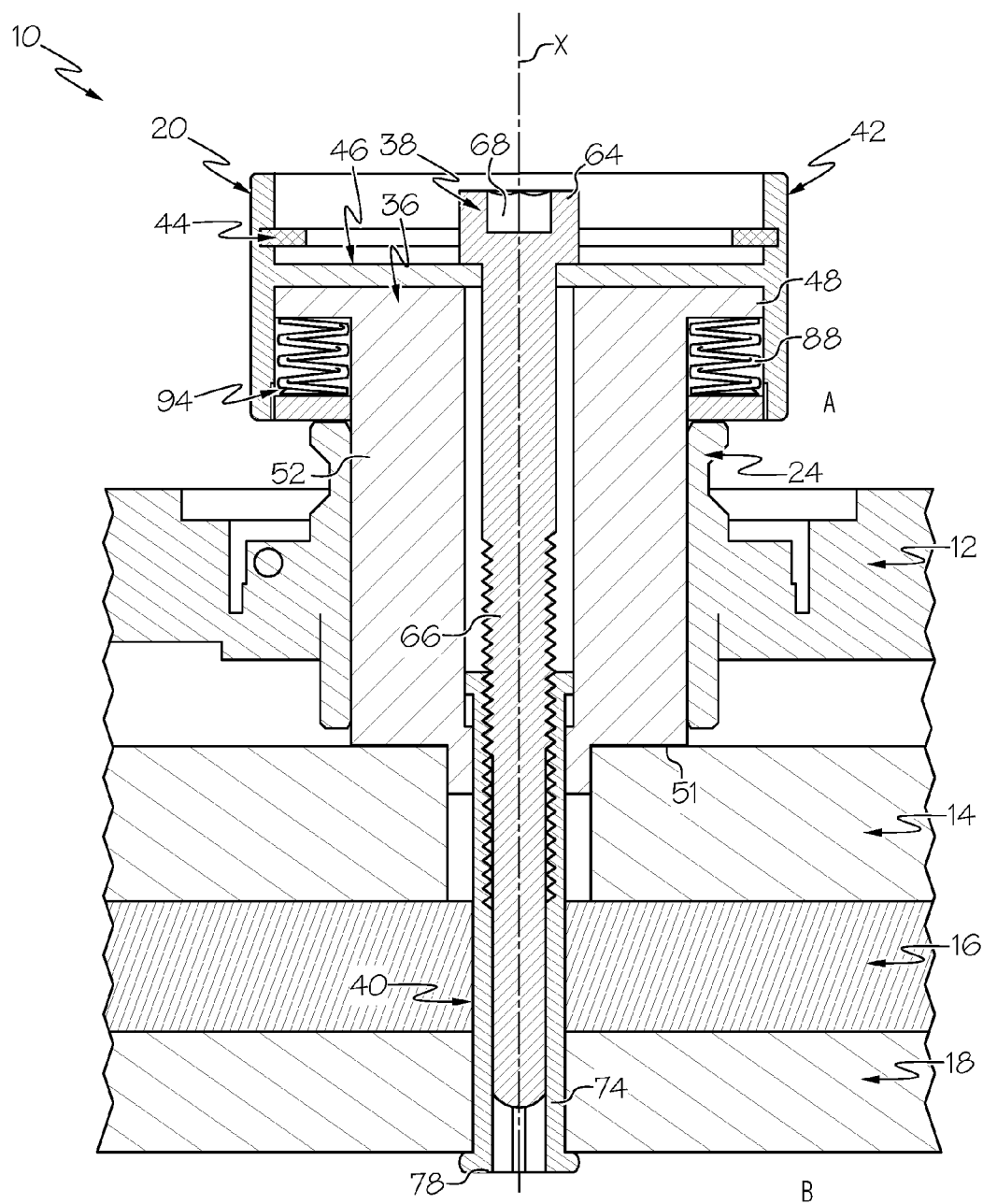
FIG. 4 is a side cross-sectional view of the portion of the overlapping work pieces, the drill jig and the fastener of FIG. 1 connected together in a second state.

In step 106, a fastener driving tool (e.g. drill bit of a drill) is inserted into the recess 68 of the head 64 of the bolt 38 and the head 64 is torqued by the driving tool until the head axially moves down and engages the washer 46, driving both the washer 46 and fastener body 36 downward relative to the casing. This axial movement causes the flange 48 to compress the wave spring 88. The head 64 is torqued a predetermined number of rotations until the lower axial end 51 makes contact with the first work piece and a 500 lb load (F1) is applied to the drill jig 12 and overlapping work pieces 14, 16, 18. In this exemplary embodiment, the 500 lb application enables sufficient securement of the drill jig 12 to the overlapping work pieces 14, 16, 18 for use as a guide to drill holes but without causing significant deformation or other damage to the second drill bushing 24 or other portions of the drill jig 12. In this exemplary embodiment, the wave spring 88 is designed to compress about 0.100 inches to achieve the application of the 500 lb to the drill jig 12 and overlapping work pieces 14, 16, 18. However, it should be noted that other wave springs or dampers may compress at different distances to achieve 500 lb application. Simultaneously, during the torquing of the head 64 of the bolt 38, the shaft 66 of the bolt 38 moves downward and extends into the collet portion 74 of the sleeve 40. Since the diameter of the shaft 66 is larger than the diameter of the collet portion 74, the shaft 66 causes the collet portion 74 and second flange 78 to flex outwardly as the shaft 66 moves through the collet portion 74 until the second flange 78 engages the underside of the second work piece 16 resulting in a bayonet type attachment. Also, as the shaft 66 moves through the collet portion 74 along the X axis, the sleeve 40 does not spin or rotate due to frictional force between the outer surface of the sleeve 40 and the fastener body 36. The wave spring 88 ceases to compress when the axial end 51 of the middle portion 52 of the fastener body contacts the first work piece 14. FIG. 4 shows this position or second state in which the 500 lb load is applied to the drill jig 12 and the overlapping work pieces 14, 16, 18.

In step 108, the head 64 of the bolt 38 is continued to be torque by the drill until the material from point C to B (FIG. 5) is compressed to a load of 2000 lb (F2). In this exemplary embodiment, a 2000 lb load imparts sufficient clamping force to the work pieces 14, 16, 18 prior to drilling in order to reduce or eliminate formation of the burrs so as to avoid disassembly of the work pieces, deburring of the drilled holes, cleaning, and the application of sealant between the work pieces and reassembly of the work pieces into the final configuration.

Figure 5:
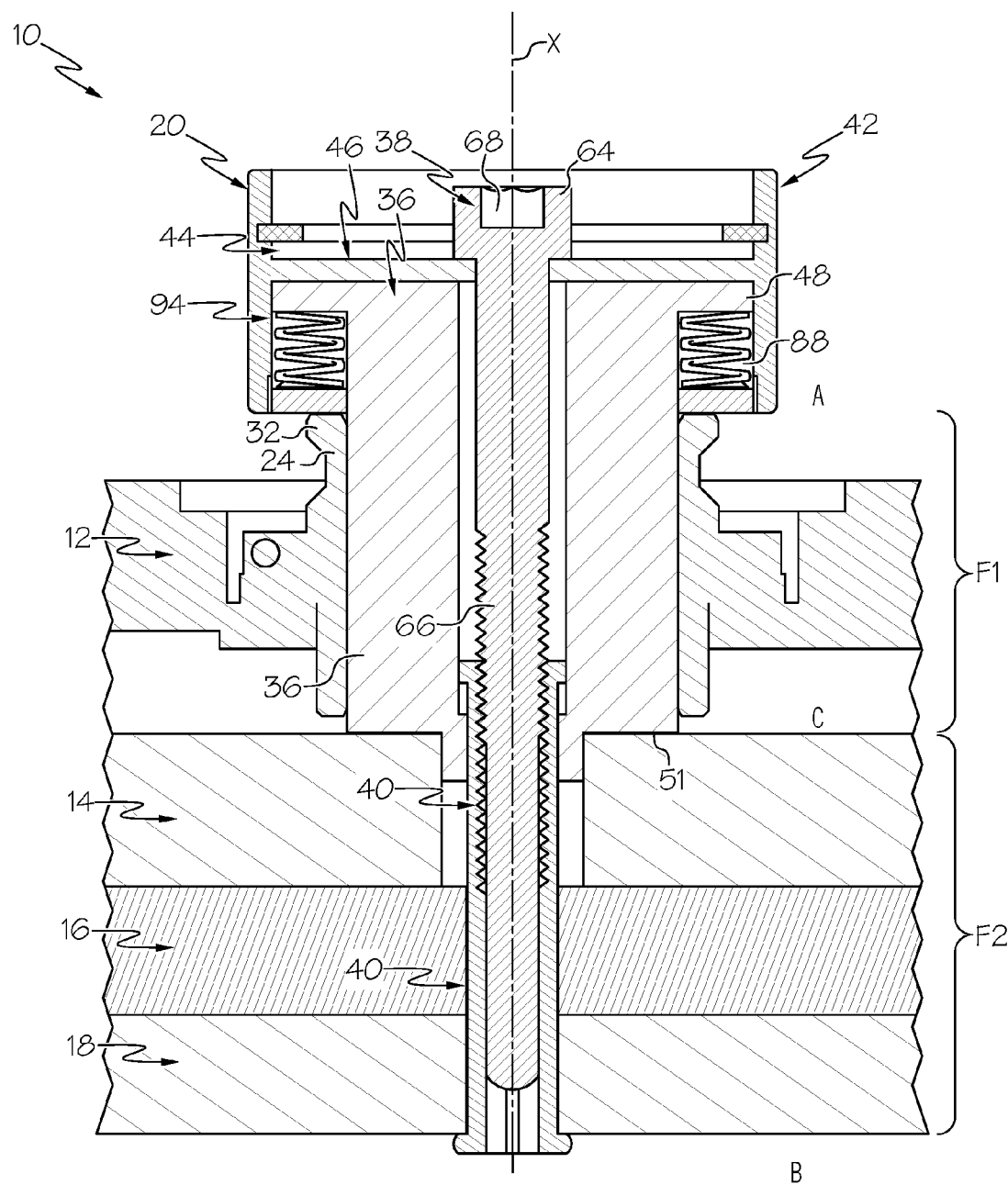
FIG. 5 is a side cross-sectional view of the portion of the overlapping work pieces, the drill jig and the fastener of FIG. 1 connected together in a third state.

However, due this novel arrangement, the further compression of the wave spring 88 takes up the increase load such that the distance from point A to C (FIG. 5) does not change. Thus, the load remains at 500 lb on the lip 32 of the second drill bushing 24 so that no significant deformation or other damage to the second drill bushing 24 or other portions of the drill jig 12 occurs. FIG. 5 shows the drill jig 12 being fastened to the overlapping work pieces 14, 16, 18 by the fastener 20 in this position or third state in which a 500 lb load is applied to the drill jig 12 and a 2000 lb load is applied to the overlapping work pieces 14, 16, 18. As seen in FIG. 5, the gaps between the overlapping work pieces 14, 16, 18 are also eliminated. In essence, the fastener 20 serves a dual purpose of fastening the drill jig 12 to the work pieces 14, 16, 18, without significantly deforming or damaging the drill jig 12, while also clamping the work pieces 14, 16, 18 together at a sufficient force to enable accurate drilling and securement of the work pieces together.

It should be noted that the 500 lb load applied to the drill jig 12 and the 2000 lb load applied to the overlapping work pieces 14, 16, 18 are the load values design for this exemplary embodiment. However, depending on the material, design and strength or other requirements of the work pieces, drill jigs or fasteners in other exemplary embodiments, these load values may change. A range of load values may also be suitable for a particular embodiment. In general, various load values may be used as long as (a) the applied load to the drill jig is sufficient to enable securement of the drill jig to the overlapping work pieces for use as a guide to drill holes, but without causing significant deformation or other damage to the second drill bushing or other portions of the drill jig, and (b) the applied load to the overlapping work pieces is sufficient to reduce or eliminate formation of the burrs so as to avoid disassembly of the work pieces, deburring of the drilled holes, and the application of sealant between the pieces and reassembly of the pieces into the final configuration.

Also, other types of springs, such as coil springs or leaf springs that reduced the load, may be used instead of the wave spring. Further, other types of dampers may be used instead of springs including damping material provided inside the damper housing or used to form the elements of the damper housing itself to achieve sufficient securement of the drill jig to the overlapping work pieces for use as a guide to drill holes, but without causing significant deformation or other damage to the second drill bushing or other portions of the drill jig.

Figure 7:
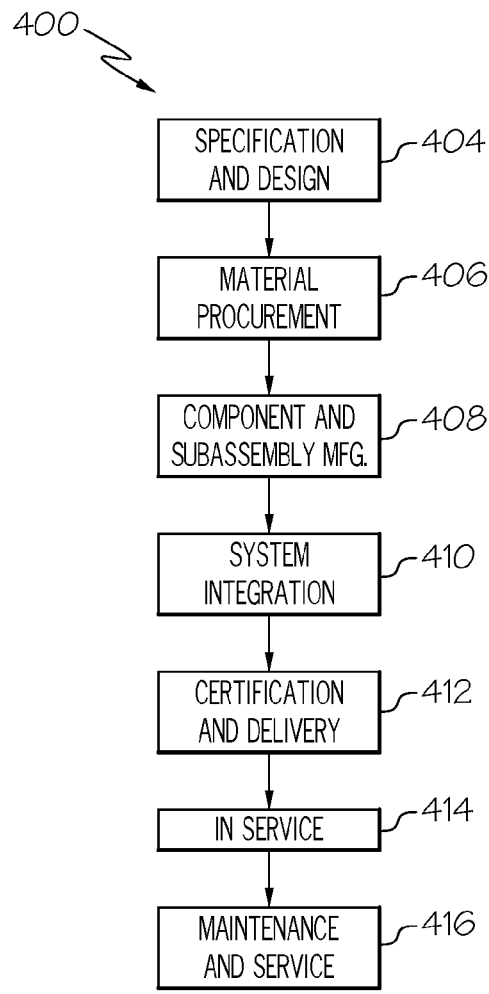
FIG. 7 is flow diagram of an aircraft manufacturing and service methodology.
Figure 8:
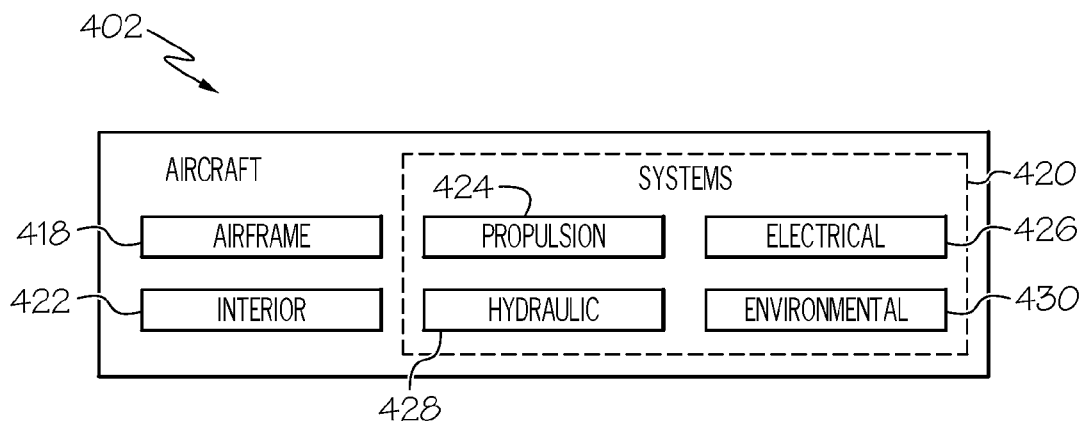
FIG. 8 is a block diagram of an aircraft.

Examples of the disclosure may be described in the context of an aircraft manufacturing and service method 400, as shown in FIG. 7, and an aircraft 402, as shown in FIG. 8. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party and/or an operator (e.g., a customer). For the purposes of this description, a system integrator may include without limitation any number of aircraft manufacturers and major-system subcontractors; a third party may include without limitation any number of venders, subcontractors and suppliers; and an operator may be an airline, leasing company, military entity, service organization and so on.

As shown in FIG. 8, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428 and an environmental system 430. Any number of other systems may be included.

The disclosed fastening system may be employed during any one or more of the stages of the aircraft manufacturing and service method 400. As one example, the disclosed fastening system may be employed during material procurement 406. As another example, components or subassemblies corresponding to component/subassembly manufacturing 408, system integration 410 and or maintenance and service 416 may be fabricated or manufactured using the disclosed fastening system. As another example, the airframe 418 and/or the interior 422 may be constructed using the disclosed fluid-tight mechanical fastening system. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed fastener, fastening system and associated structural assembly are described in the context of an aircraft; however, one of ordinary skill in the art will readily recognize that the disclosed fastening system and associated structural assembly may be utilized for a variety of vehicles, as well as for non-vehicle applications. For example, implementations of the embodiments described herein may be implemented in any type of vehicle including, e.g., helicopters, passenger ships, automobiles and the like.

Although various embodiments of the disclosed fastener, fastening system and associated structural assembly have been shown and described, modifications may occur to those skilled in the art upon reading the specification. The present application includes such modifications and is limited only by the scope of the claims.

What is claimed is:

1. A fastener for fastening a drill jig to overlapping work pieces and clamping the overlapping work pieces for facilitating accurate drilling of the overlapping work pieces, said fastener comprising:
a fastener body; and
a damper assembly,
wherein said damper assembly is operatively connected to said fastener body,
wherein said damper assembly is configured to enable application of a first load to said drill jig and said fastener body is configured to enable application of a second load to said overlapping work pieces when said fastener fastens the drill jig to the overlapping work pieces,
wherein said first load is less than said second load,
wherein said first load is sufficient to hold the drill jig to the overlapping work pieces during drilling but without causing significant deformation of the drill jig, and
wherein said second load is sufficient to reduce the formation of burrs during drilling of a hole through said overlapping working pieces.

2. The fastener of claim 1 further comprising a housing, wherein said damper assembly comprises a damper, wherein said housing houses said damper.

3. The fastener of claim 1 wherein said damper assembly comprises a wave spring.

4. The fastener of claim 3 further comprising a housing, wherein said housing houses said wave spring, wherein said damper assembly comprises an adjusting device, wherein said adjusting device is configured to adjust the axial length of said housing.

5. The fastener of claim 1 wherein said fastener body defines a through-bore, wherein said overlapping work pieces comprise a pilot hole, wherein said drill jig comprises a drill bushing, wherein said fastener body is configured to extend through said drill bushing such that said through-bore is aligned with said pilot hole, a sleeve, wherein said sleeve partially extends into said through-bore and engages said fastener body, wherein said sleeve is configured to extend through said pilot hole and engage said work pieces, a bolt, wherein said bolt extends through said through-bore and into threaded engagement with said sleeve.

6. The fastener of claim 1 wherein said damper assembly comprises a casing, wherein said casing extends around said fastener body, wherein said fastener body comprises a flange, wherein said damper assembly comprises an adjusting ring, wherein said flange, said casing and said adjusting ring define a housing for housing said damper, wherein said adjusting ring is configured to adjust the axial length of said housing.

7. The fastener of claim 6 further comprising a retaining ring, wherein said retaining ring comprises an outer portion, wherein said casing comprises a circumferential groove that receives said outer portion of said retaining ring to retain the damper assembly to the damper body.

8. The fastener of claim 6 wherein said adjusting ring is positioned between said damper body and said casing and extends around said damper body, wherein said adjusting ring is in threaded engagement with said casing such that rotation of said adjusting ring around said damper body adjusts the axial length of said housing.

9. A structural assembly comprising:
a drill jig, wherein the drill jig comprises a drill bushing;
overlapping work pieces, wherein said overlapping work pieces comprise a pilot hole; and
a fastener, wherein said fastener extends through said drill bushing and said pilot hole to fasten said drill jig to said overlapping work pieces and clamp the overlapping work pieces together for facilitating accurate drilling of the overlapping work pieces, wherein said fastener comprises:
  a fastener body; and
  a damper assembly, wherein said damper assembly is connected to said fastener body,
  wherein said damper assembly enables application of a first load to said drill jig and said fastener body enables application of a second load to said overlapping work pieces, wherein said first load is less than said second load, wherein said first load is sufficient to hold the drill jig to the overlapping work pieces during drilling but without causing significant deformation of the drill jig, wherein said second load is sufficient to reduce the formation of burrs during drilling of a hole through said overlapping working pieces.

10. The structural assembly of claim 9 wherein one of said overlapping work pieces is formed from a metallic material and another one of said overlapping work pieces is formed from a composite material.

11. The structural assembly of claim 9 wherein one of said overlapping work pieces is formed from an aluminum material and another one of said overlapping work pieces is formed from a carbon fiber reinforced plastic material.

12. The structural assembly of claim 9 wherein said drill jig is formed of a material that has a hardness that is less than the hardness of the material of the overlapping work pieces.

13. The structural assembly of claim 9 wherein said overlapping work pieces are part of an aircraft.

14. The structural assembly of claim 9 wherein said damper assembly comprises a wave spring.

15. The structural assembly of claim 14 wherein said fastener body defines a through-bore, wherein said fastener body extends through said drill bushing such that said through-bore is aligned with said pilot hole, a sleeve, wherein said sleeve partially extends into said through-bore and engages said fastener body, wherein said sleeve extends through said pilot hole and engages said work pieces, a bolt, wherein said bolt extends through said through-bore and into threaded engagement with said sleeve.

16. The structural assembly of claim 9 wherein said damper assembly comprises a casing, where said casing extends around said fastener body, wherein said fastener body comprises a flange, wherein said damper assembly comprises an adjusting ring, wherein said adjusting ring is positioned between said damper body and said casing and extends around said damper body, wherein said flange, said casing and said adjusting ring define a housing for housing said damper, wherein said adjusting ring is in threaded engagement with said casing such that rotation of said adjusting ring around said damper body adjusts the axial length of said housing.

17. A method for fastening a drill jig to said overlapping work pieces and clamping said overlapping work pieces together for facilitating accurate drilling of said overlapping work pieces comprising:
positioning said drill jig onto said overlapping work pieces such that a drill bushing of said drill jig is aligned over a pilot hole in said overlapping work pieces;
inserting a fastener through said drill bushing and said pilot hole, wherein said fastener comprises a fastener body and damper assembly, wherein said damper assembly is operatively connected to said fastener body;
driving said fastener to a predetermined position such that a first load is applied via said damper assembly to said drill jig and a second load is applied via said fastener body to said overlapping work pieces, wherein said first load is less than said second load, wherein said first load is sufficient to hold the drill jig to the overlapping work pieces during drilling but without causing significant deformation of the drill jig, wherein said second load is sufficient to reduce burring during drilling of a hole through said overlapping working pieces.

18. The method of claim 17 wherein said fastener comprises a bolt and a sleeve, wherein said fastener body defines a through-bore, wherein said sleeve partially extends into said through-bore and engages said fastener body, wherein said bolt extends through said through-bore and into threaded engagement with said sleeve, wherein the step of inserting a fastener through said drill bushing and said pilot hole comprises inserting said fastener body through said drill bushing and inserting said sleeve through said pilot hole to engage said work pieces, wherein the step of driving said fastener to a predetermined position comprises torquing said bolt a predetermined number of rotations to cause axial movement of said fastener body towards said overlapping work pieces.

19. The method of claim 17 wherein said damper assembly comprises a wave spring, wherein the step of driving said fastener such that a first load is applied via said damper assembly to said drill jig comprises compressing said wave spring.

20. The method of claim 17 wherein said damper assembly comprises a wave spring, wherein said fastener comprises a bolt, wherein said fastener body defines a through-bore, wherein said bolt extends through said through-bore, wherein driving said fastener to a predetermined position comprises:

torquing said bolt to axially move said fastener body to a first position in which the first load is applied to said drill jig and said overlapping work pieces; and torquing said bolt to axially move said fastener body to a second position in which the first load is applied to said drill jig and the second load is applied to said overlapping work pieces, wherein the step of torquing said bolt to axially move said fastener body to a second position comprises compressing said wave spring to keep the first load to be applied to said drill jig.

* * * * *